3,013,013
5-CYANOMETHYLENE-2-OXO-3-PYRROLINES
Rudolph A. Carboni, Wilmington, Del., assignor to E. I. du Pont de Nemours and Company, Wilmington, Del., a corporation of Delaware
No Drawing. Filed Apr. 24, 1959, Ser. No. 808,537
8 Claims. (Cl. 260—240)

The present invention is concerned with a new class of colored organic chemical compounds which are useful as dyes and more particularly deals with 5-substituted-2-oxo-3-pyrrolines.

In the family of dyes of this invention, the presence of a substituted methylene group at the 5-position in the 2-oxo-3-pyrroline ring is associated with a generic superiority in light fastness over related dyes having a chalcogen atom in place of the substituted methylene group.

The new class of dyes comprises the 5-cyanomethylene-2-oxo-3-pyrrolines. These are generically new compounds. The 5-cyanomethylene-2-oxo-3-pyrroline nucleus is fundamental to the characteristic property of these compounds of being visibly colored. This characteristic carries through the entire class of compounds.

The 5-cyanomethylene-2-oxo-3-pyrroline dyes particularly embrace (A) the 5-cyanomethylene-2-oxo-3-pyrrolines in which the 4-position and the remaining ($\alpha$) position of the methylene carbon atom carry members of the group consisting of —CN, —SO$_2$R, —COOR and —CONR$_2$ in which R is hydrogen or a hydrocarbyl group and the 1-position carries an R group.

The dyes of group A in turn embrace (B) the compounds of group A in which the 3-position carries an R group; (C) the compounds of group A in which the 3-position carries a halogen radical (particularly chloro and bromo); and (D) the compounds of group A in which the 3-position carries a group Q which is a monovalent organic radical such that the corresponding compound QH will condense with benzene diazonium chloride to yield an azo dye.

The compounds of group C are particularly useful for preparing the dyes of group D and this invention embraces the process of reacting a compound of group C with a compound QH to obtain a dye of group D. The dyes of group D are preferred over the other 5-cyanomethylene-2-oxo-3-pyrrolines of this invention for their stronger colors and superior dyeing properties. These dyes may be represented by the formula

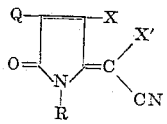

where R is hydrogen or a hydrocarbyl group, X and X' may be —CN, —SO$_2$R, —COOR or —CONR$_2$ and Q is a monovalent organic radical such that the corresponding compound QH will condense with benzene diazonium chloride to yield an azo dye, i.e., C$_6$H$_5$N=N—Q.

The definition of the radical Q can be readily understood from the fact that the 3-halogen compounds of group C above have the same capacity for coupling with color formers (i.e., compounds QH) as the aryl diazonium halides. The coupling reactions of the aryl diazonium salts are well known to all dye chemists. They are discussed in detail by K. H. Saunders in "The Aromatic Diazo Compounds and Their Technical Applications," Edward Arnold & Co., London, Second edition, 1949, particularly pages 194–219.

The definition of Q is based specifically on the reactivity of benzene diazonium chloride for present purposes partly because benzene diazonium chloride is the simplest and most available of the aryl diazonium halides and partly because this means serves to point out that hydrocarbon compounds such as benzene and monoalkoxy benzenes are not included among the color formers which yield the preferred dyes of group D. Benzene and anisole will react with certain highly activated aryl diazonium halides but not with benzene diazonium chloride to yield azo dyes.

To fit the above definition of Q, a compound QH must be capable of reacting with benzene diazonium chloride to yield an azo dye, i.e., a compound C$_6$H$_5$—N=N—Q. The test to determine reactivity with benzene diazonium chloride may be conducted very simply as follows:

Benzene diazonium chloride test reagent is prepared by treating one molecular equivalent of aniline with 2.7 molecular equivalents of hydrogen chloride as a concentrated aqueous solution. This solution is cooled to 0° C. and treated with one molecular equivalent of sodium nitrite, dissolved in twice its weight of water. The addition of the nitrite solution is carried out at a rate so that the temperature does not exceed 5° C.

Ten milligrams of the compound QH to be tested is dissolved in 1–2 ml. of acetone and to this solution is added about 0.25 g. of sodium acetate. The latter is preferably ground to a fine powder. One to three drops of the diazonium solution is added to the test mixture. When QH contains an electron-donating group or is an active methylene compound, the addition of the benzene diazonium chloride causes the immediate formation of an azo dye ranging in color from deep orange through red, purple, to green. An alternative way of expressing the result is that there is formed an azo compound having at least one absorption peak between 350 and 750 millimicrons.

Compounds which react positively to the benzene diazonium chloride test above, i.e., compounds which fit the definition of QH, include principally those compounds containing electron-donating groups and compounds containing active methylene groups. Electron-donating groups are auxochrome and chromophore groups well known to dye chemists such as —OR, —NR$_2$ and other organic radicals with bonds stemming from nitrogen, R being hydrogen or a hydrocarbyl radical as defined above, and electronic equivalents of these groups. Particularly included QH compounds are aromatic compounds containing electron-donating groups. By aromatic compounds I mean to include all compounds having clearly aromatic properties, such as benzene, naphthalene, anthracene, phenanthrene, benzpyrene, trypticene, rubrene, hexacene, coronene, furan, thiophene, pyrrole and the like.

To point out the dyes of this invention having the strongest colors, it may be noted that a still more particularly preferred group comprises pyrrolines of the above formula where X, X' and R are as defined above and Q may be R$_2$'NAr—, RCONHNRAr—, RCH=NNRAr—, R$_2$N—N=CH—(CH=CH)$_n$Ar—, (R$_2$'NAr)$_2$C=CH—,

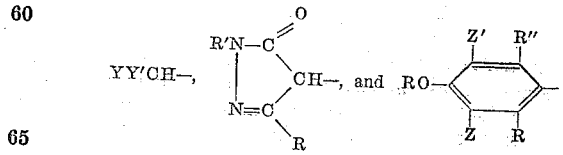

in which Ar is arylene; R" is hydrogen or hydrocarbyl; and R' is hydrocarbyl, $\beta$-alkoxyethyl, $\beta$-acyloxyethyl, $\beta$-cyanoethyl or $\beta$-trialkylammoniumethyl; Y and Y' are —CN, —COOR, —COR, —CONR$_2$, —CSNR$_2$, —SO$_2$R, —NO$_2$, —NR$_3^+$ and —SR$_2^+$; Z is alkyl, halogen, —SO$_3$Na or Y; Z' is hydrogen or Z, with the proviso that Z' and R" taken together may form another aryl ring; and $n$ is 0 or 1. It is to be understood that in a given compound the several embodiments of R and R' that may be involved may be the same or different, respectively.

By arylene I mean generically any divalent aromatic radical. It is of the essence of an arylene radical that the two bonds stem from different ring carbon atoms. Among arylene radicals are included those from which the corresponding aromatic compound obtained by placing hydrogens at the respective bonds of the arylene group has a resonance energy of not less than 20 kcal./mole. Resonance energies of organic compounds and the determination of resonance energies are shown by Linus Pauling in "The Nature of the Chemical Bond," Second edition, Cornell University Press, 1945, pages 132–139.

Arylene groups particularly suitable in the compounds of this invention include phenylene, naphthylene, anthrylene, furylene, thienylene, and pyrrolylene.

By the term "hydrocarbyl," used in defining the products and process of this invention, I mean any monovalent organic radical composed solely of carbon and hydrogen. I use it in its full generic sense. The wide variation in the hydrocarbyl groups used in the illustrations which follow makes it evident that all hydrocarbyl groups are operable. Hydrocarbyl groups can vary as to whether they are saturated, unsaturated, alkyl, cycloalkyl, aryl, aralkyl, alkaryl, single ring, multi ring, straight chain, branched chain, large, small and the like. The widest variation of this sort does not in any way detract from the fundamental characteristic of the hydrocarbyl radical of passing unchanged through the process of this invention, and exercising no effect whatever on the chemical steps of the process.

The limitations of space for disclosure are not to be construed as any limitation within the scope of "hydrocarbyl" contemplated in this invention. Even the most cumbersome hydrocarbyl radicals such as those obtained by removing end groups from high molecular weight hydrocarbon polymer molecules containing thousands of carbon atoms, such as polyethylene, polyisobutylene, polyisoprene, polystyrene and the like, are fully operable.

It is obvious that hydrocarbyl groups containing 20 or fewer carbon atoms are most available, and to that extent preferred. But there is to be no question of the operability of, or of the intent to include and disclose any hydrocarbyl group whatsoever. Except for factors of bulk and dilution, wide variations in size and structure of hydrocarbyl radicals have no effect on the color of the 5-cyanomethylene-2-oxo-3-pyrroline dyes to which they are attached. All 5-cyanomethylene-2-oxo-3-pyrrolines obtainable by variation of hydrocarbyl groups within the above definitions are hereby disclosed. Routineering to disclose each and every possible hydrocarbyl embodiment is superfluous.

The process of this invention may be illustrated by the equation

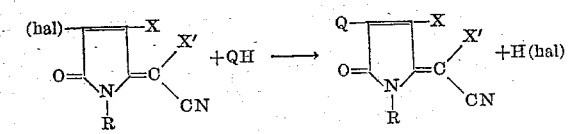

where (hal) is halogen, i.e., fluorine, chlorine, bromine and iodine.

In the above process it is not necessary to isolate the 3-halogeno starting materials. As illustrated in the examples the halogen intermediates may be used for the preparation of dyes without isolating them from the media in which they are prepared. The 3-halogeno starting materials are conveniently prepared by treating the sodium salt of the corresponding 3-hydroxy compound with a strong halogenating agent such as phosphorus oxychloride, thionyl chloride, oxalyl chloride, benzotrichloride, benzene sulfonyl chloride, phosphorus tribromide, phosphorus oxybromide, thionyl bromide and the like.

As indicated by the wide variations in the examples, there are no process variables which appear critical. As shown in the examples, it suffices to bring the reactants together and no auxiliary materials are required.

It is convenient, although not essential, to employ as a reaction medium an organic solvent which is inert to the reactants and products. Thus, there can be employed aliphatic or aromatic hydrocarbons, dialkyl ethers, cyclic ethers, such as dioxane and tetrahydrofuran, esters, N,N-dimethylformamide, N,N-diethylformamide, N-methylformanilide, N-methylformamide, formamide, N-methyl-N-ethylacetamide, N,N-dimethylacetamide, N,N-diethylacetamide, tetramethylurea, tetraethylurea, pyridine, dimethylsulfoxide, 2,2,2-trifluoroethanol, acetonitrile, and mixtures of these liquids. Esters and alkanenitriles are the preferred class of solvents. Since the reaction of this process is mildly exothermic, the use of an inert reaction medium facilitates dissipation of the heat of reaction.

The temperature at which the reaction of this invention is carried out may be varied widely, for example, from temperatures below 0° C. up to the decomposition temperature of the reactants or products. In general, however, it is preferred to operate in the range of 0–200° C., and best yields are obtained when operating in the range of 20–100° C.

The reaction of a 5-cyanomethylene-2-oxo-3-pyrroline with a compound QH according to this invention takes place between equimolecular quantities of the reactants. However, this in no way limits the molar proportions of these reactants which may be brought together within the limits of the process. The relative amounts may be varied widely, for example, from molar ratios of 19:1 to 1:19. However, highest yields are obtained when approximately equimolar quantities are employed.

Pressure is not a critical variable in this process, and atmospheric pressure is ordinarily preferred for convenience, although pressures above or below atmospheric are operable.

In the following examples parts are by weight unless otherwise indicated. Example V represents a preferred embodiment of the invention.

EXAMPLE I

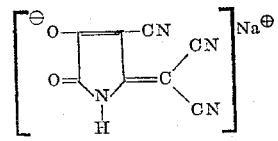

Part A

A solution of 132 parts of malononitrile dimer [C(CN)$_2$=C(NH$_2$)CH$_2$CN, Carboni et al., J. Am. Chem. Soc. 80, 2838–40 (1958)] and 160 parts of diethyl oxalate in 793 parts of absolute methanol is added quickly to a solution of 108 parts of sodium methoxide in 595 parts of absolute methanol. The solution becomes warm and turns yellow. It is stirred at room temperature for two hours. About one third of the methanol is removed by distillation. The mixture is diluted with two volumes of dry benzene. The yellow precipitate which forms is collected by filtration to yield 203 parts of the disodium salt of 4-cyano-5-dicyanomethylene-3-hydroxy-2-oxo-3-pyrroline. This salt is purified by recrystallization from 90/10 n-propyl alcohol/water.

*Analysis.*—Calcd. for C$_8$N$_4$O$_2$Na$_2$: Na, 19.99. Found: Na, 19.60.

Part B

The disodium salt of 4-cyano-5-dicyanomethylene-3-hydroxy-2-oxo-3-pyrroline is dissolved in a minimum of water and treated with a molecular excess of aqueous hydrochloric acid. The dihydrate of the corresponding monosodium salt is obtained as a bright yellow precipitate which is collected by filtration and purified by recrystallization from 90/10 n-propyl alcohol/water.

*Analysis.*—Calcd. for $C_8HN_4O_2Na \cdot 2H_2O$: C, 39.35; H, 2.06; N, 22.94; Na, 9.42. Found: C, 39.69; H, 2.28; N, 22.81; Na, 8.82.

EXAMPLE II

Part A

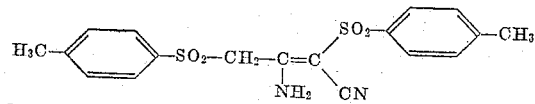

To a solution of 23 parts of sodium in 3947 parts of ethanol at 0° C. is added 390 parts of p-toluenesulfonylacetonitrile. The mixture is then heated at reflux for 2.5 hours and allowed to stand over night at room temperature. The solution is diluted with 20,000 parts of water and carefully acidified with concentrated hydrochloric acid. p-Toluenesulfonylacetonitrile dimer (2-amino-1-cyano-1,3-di[p-toluenesulfonyl]propene) separates as a crystalline precipitate. This is separated by filtration and recrystallized from ethanol. Yield 245 parts, M.P. 194.5–195.5° C.

*Analysis.*—Calcd. for $C_{18}H_{18}N_2O_4S_2$: C, 55.38; H, 4.62; N, 7.18; S, 16.41. Found: C, 55.54; H, 4.61; N, 7.70, 7.38; S, 16.56.

Part B

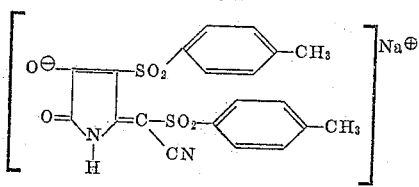

To a solution of 83 parts of sodium in 3947 parts of ethanol is added 700 parts of p-toluenesulfonylacetonitrile dimer and 263 parts of diethyl oxalate. The resulting solution is stirred and heated at reflux for 1.25 hours, then diluted with 8794 parts of benzene and filtered to obtain 540 parts of the bright yellow crystalline disodium salt of 5-(α-cyano-α-p-toluenesulfonyl)methylene-3-hydroxy-2-oxo-4-p-toluenesulfonyl-3-pyrroline. This is suspended in 5000 parts of water and 357 parts of concentrated hydrochloric acid is added slowly with stirring. There is precipitated 410 parts of the pale yellow crystalline monosodium salt of 5-(α-cyano-α-p-toluenesulfonyl) methylene-3-hydroxy-2-oxo-4-p-toluenesulfonyl - 3 - pyrroline.

EXAMPLE III

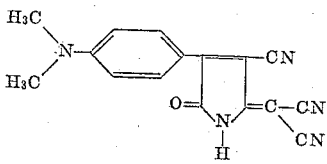

To a mixture of 10 parts of the dihydrate of the monosodium derivative of 4-cyano-5-dicyanomethylene-3-hydroxy-2-oxo-3-pyrroline and 191 parts of N,N-dimethylaniline about 25 parts of phosphorus oxychloride is added. The resulting mixture is heated at 80–100° C. for a few minutes and turns blue-green in color with the formation of 4-cyano-5-dicyanomethylene-3-(p-N,N-dimethylaminophenyl)-2-oxo-3-pyrroline.

Dyeing A

A dyebath is prepared using 10,000 parts of water containing two parts of a sulfonated lignin dispersant ("Marasperse CB," Marathon Co.). The bath is rendered alkaline to pH 8 by adding 200 parts of 5% aqueous sodium bicarbonate solution. A solution of two parts of 4-cyano-5-dicyanomethylene-3-(p-N,N - dimethylaminophenyl)-2-oxo-3-pyrroline in 284 parts of N,N-dimethylformamide is added with stirring. The dyebath is heated at 80–100° C. and swatches of cellulose acetate and nylon fabrics weighing 10 parts each are added. After a few minutes the cellulose acetate is dyed red-blue and the nylon is dyed medium brown. When the dyed fabrics are treated with 5% aqueous hydrochloric acid, both turn bright blue. They retain the bright blue color after rinsing and drying.

EXAMPLE IV

*Preparation of 3-chloro-4-cyano-5-dicyanomethylene-2-oxo-3-pyrroline*

Fifty parts of the dihydrate of the monosodium derivative of 4-cyano-5-dicyanomethylene-3-hydroxy-2-oxo-3-pyrroline is suspended in 157 parts of acetonitrile and 60 parts of oxalyl chloride is added. The mixture is stirred and heated at reflux for one hour. The mixture is then cooled and the precipitate which forms is collected by filtration, washed with acetonitrile and dried under reduced pressure to obtain 36 parts (80% yield) of crude 3-chloro-4-cyano-5-dicyanomethylene-2-oxo-3-pyrroline in the form of buff-colored crystals. It is purified by sublimation at 180° C. and 0.1 mm. pressure to give colorless crystals.

*Analysis.*—Calcd. for $C_8HN_4ClO$: C, 47.06; H, 0.49; N, 27.45; Cl, 17.40. Found: C, 47.53; H, 0.77; N, 27.28, 27.46; Cl, 16.99, 17.04.

EXAMPLE V

To a solution of 15 parts of 3-chloro-4-cyano-5-dicyanomethylene-2-oxo-3-pyrroline in 2250 parts of ethyl acetate is added 48 parts of N,N-dimethylaniline. The mixture is allowed to stand at room temperature for two hours. A precipitate of 20 parts of 4-cyano-5-dicyanomethylene-3-(p-N,N-dimethylaminophenyl)-2-oxo-3 - pyrroline is recovered by filtration. It is recrystallized from dimethylformamide.

*Analysis.*—Calcd. for $C_{16}H_{11}N_5O$: C, 66.4; H, 3.8. Found: C, 66.2; H, 4.2.

EXAMPLE VI

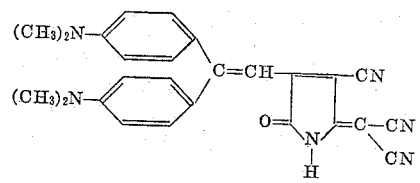

To a solution of 15 parts of 3-chloro-4-cyano-5-dicyanomethylene-2-oxo-3-pyrroline in 450 parts of ethyl acetate is added a solution of 20 parts of 1,1-bis(p-N,N-dimethylaminophenyl)ethylene in 900 parts of ethyl acetate. The mixture is allowed to stand at room temperature for 1.5 hours. A precipitate of 28 parts of 4-cyano-5-dicyanomethylene-3-[2,2 - bis(p - N,N - dimethylaminophenyl)vinyl]-2-oxo-3-pyrroline is recovered by filtration. It is recrystallized from acetic acid and further purified by sublimation. An ethanol solution of this dye shows an absorption maximum at 759 millimicrons.

*Analysis.*—Calcd. for $C_{26}H_{22}N_6O$: C, 71.9; H, 5.1; N, 19.4. Found: C, 70.5; H, 5.0; N, 19.0, 18.8.

EXAMPLE VII

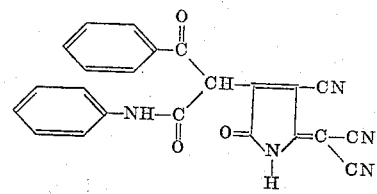

The procedure of Example V is repeated using pyridine in place of ethyl acetate and benzoylacetanilide in place of N,N-dimethylaniline. The product is 3-[(benzoyl)(N-phenylcarbamoyl)methyl]-4-cyano-5-dicyanomethylene-2-oxo-3-pyrroline which gives orange ethanol solutions having an absorption maximum at 500 millimicrons.

EXAMPLE VIII

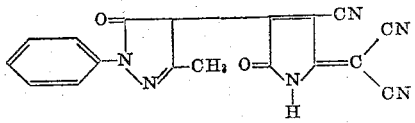

The procedure of Example V is repeated using pyridine in place of ethyl acetate and 3-methyl-1-phenyl-5-pyrazolone in place of N,N-dimethylaniline. The product is 4-cyano-5-dicyanomethylene-3-(3-methyl-1-phenyl-5-pyrazolon-4-yl)-2-oxo-3-pyrroline which gives purple ethanol solutions having an absorption maximum at 568 millimicrons.

EXAMPLE IX

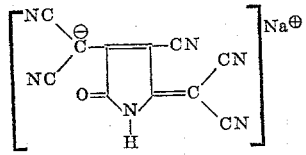

To a solution of 204 parts of 3-chloro-4-cyano-5-dicyanomethylene-2-oxo-3-pyrroline in 1800 parts of ethyl acetate is added 88 parts of sodiomalononitrile. The sodium salt of 4-cyano-3-dicyanomethyl-5-dicyanomethylene-2-oxo-3-pyrroline precipitates as a brick red solid. This dye (168 parts) is recovered by filtration and recrystallized from water. It gives orange solutions in water.

EXAMPLE X

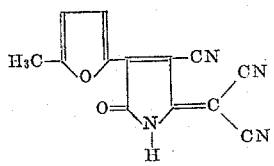

A mixture of 102 parts of 3-chloro-4-cyano-5-dicyanomethylene-2-oxo-3-pyrroline and 184 parts of α-methylfuran in 945 parts of N,N-dimethylformamide is prepared and allowed to stand at room temperature for about 18 hours. The solution is then diluted with 2500 parts of water to precipitate 120 parts of 4-cyano-5-dicyanomethylene-3-(5-methyl-2-furyl)-2-oxo-3-pyrroline, a dark orange solid melting above 250° C. Solution of this product in ethanol and acetonitrile are bright yellow.

EXAMPLE XI

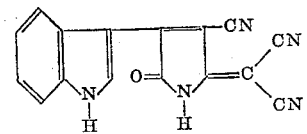

To a solution of 10 parts of 3-chloro-4-cyano-5-dicyanomethylene-2-oxo-3-pyrroline in 1800 parts of ethyl acetate is added 5 parts of indole. The solution is warmed to 50–60° C. and within a few minutes 4-cyano-5 - dicyanomethylene - 3 - (3 - indolyl) - 2 - oxo - 3 - pyrroline forms as a bright red dye. Tht solution shows absorption maxima at 525 millimicrons and 370 millimicrons.

EXAMPLE XII

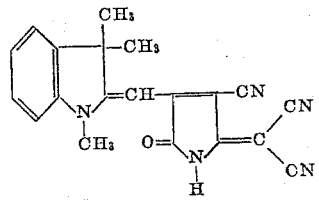

Ten parts of 3-chloro-4-cyano-5-dicyanomethylene-2-oxo-3-pyrroline is dissolved in 1566 parts of acetonitrile. To this solution 5 parts of 2-methylene-1,3,3-trimethylindoline (Fischer's base) is added. The solution is heated at 50–60° C. and within a few minutes 4-cyano-5 - dicyanomethylene - 2 - oxo - 3 - (1,3,3 - trimethyl - 2-indolinylidene)methyl-3-pyrroline forms as a purple dye. Acetone is added and the resulting dye solution shows absorption maxima at 591 and 360 millimicrons with relative intensities of 192.3 and 35 respectively.

The following table shows additional dyes prepared by the procedure of Example XII. In each preparation 5 parts of the indicated color former is used in place of the 2-methylene-1,3,3-trimethylindoline in Example XII. The products formed, their color and absorption characteristics in acetone/acetonitrile solution are indicated in tabular form. In the absorption column an asterisk indicates that the particular absorption maximum appears as a shoulder on another band and numbers in parentheses are relative intensities, comparable only within the spectrum of a single compound and not between compounds.

TABLE I

| Example | Color former | Structure of 3-substituent in 4-cyano-5-dicyanomethylene-2-oxo-3-pyrroline | Name of dye | Acetone/acetonitrile solution | |
|---|---|---|---|---|---|
| | | | | Color | Absorption maxima (millimicrons) |
| XIII | N-methyl-N-β-cyanoethylaniline | H₃C\N-⟨phenyl⟩ / NC—CH₂—CH₂ | 4-cyano-5-dicyanomethylene-2-oxo-3-(p-[N-methyl-N-β-cyanoethylamino]phenyl)-3-pyrroline | Blue | 585(88) 383(43.2) |
| XIV | Furylacrolein phenylhydrazone | C₆H₅NHN=CH—CH=CH—⟨furyl⟩ | 4-cyano-5-dicyanomethylene-3-(5-[3-phenylhydrazonopropenyl]-2-furyl)-3-pyrroline | Green | |
| XV | Pyrrole-2-aldehyde dimethylhydrazone | (CH₃)₂NN=CH—⟨pyrryl⟩ | 4-cyano-5-dicyanomethylene-3-(5-[dimethylhydrazonomethyl]-2-pyrryl)-2-oxo-3-pyrroline | do | 680(7.8) 400(1.4) |
| XVI | 2-methylfuran | H₃C—⟨furyl⟩ | 4-cyano-5-dicyanomethylene-3-(5-methyl-2-furyl)-2-oxo-3-pyrroline | Yellow-orange | 470(263) 338(120) |
| XVII | 2-methylthiophene | H₃C—⟨thienyl⟩ | 4-cyano-5-dicyanomethylene-3-(5-methyl-2-thienyl)-2-oxo-3-pyrroline | Orange | 470(248) 410(155) 335(162) |

TABLE I—Continued

| Example | Color former | Structure of 3-substituent in 4-cyano-5-dicyanomethylene-2-oxo-3-pyrroline | Name of dye | Acetone/acetonitrile solution | |
|---|---|---|---|---|---|
| | | | | Color | Absorption maxima (millimicrons) |
| XVIII | 1-benzoyl-2-phenylhydrazine | $C_6H_5CO-N-H$ <br> $\phantom{xx}N-$ <br> $\phantom{xxx}C_6H_5$ | 3-(2-benzoyl-1-phenylhydrazino)-4-cyano-5-dicyanomethylene-2-oxo-3-pyrroline | ...do... | 416(245) <br> 350(195) |
| XIX | 1-acetyl-2-phenylhydrazine | $H_3C-CO-N-H$ <br> $\phantom{xx}N-$ <br> $\phantom{xxx}C_6H_5$ | 3-(2-acetyl-1-phenylhydrazino)-4-cyano-5-dicyanomethylene-2-oxo-3-pyrroline | ...do... | 416(199) <br> 352(148) |
| XX | 1-formyl-2-phenylhydrazine | $HCO-N-H$ <br> $\phantom{xx}N-$ <br> $\phantom{xxx}C_6H_5$ | 3-(2-formyl-1-phenylhydrazino)-4-cyano-5-dicyanomethylene-2-oxo-3-pyrroline | ...do... | 416(825) <br> 350(645) |
| XXI | 1-(p-nitrophenylamino)-7-(p-nitrophenylimino)-1,3,5-cycloheptatriene | | 4-cyano-5-dicyanomethylene-2-oxo-3-(1-[p-nitrophenylamino]-7-[p-nitrophenylimino]-1,3,5-cycloheptatrien-4-yl)-3-pyrroline | Green | 600(28.7) <br> 480(77.5) <br> 375(176) |
| XXII | 1,2,5-trimethylpyrrole | | 4-cyano-5-dicyanomethylene-2-oxo-3-(1,2,5-trimethyl-3-pyrrolyl)-3-pyrroline | Red | 510(237) <br> 426(404) <br> 343(365) |
| XXIII | Pyrrole | | 4-cyano-5-dicyanomethylene-2-oxo-3-(2-pyrrolyl)-3-pyrroline | ...do... | 506(90) <br> 410(30) <br> 384(32.5) |
| XXIV | N-methylpyrrole | | 4-cyano-5-dicyanomethylene-3-(N-methylpyrrolyl)-2-oxo-3-pyrroline | ...do... | 505(247) <br> 375(110) |
| XXV | Resorcinol dimethyl ether | | 4-cyano-5-dicyanomethylene-3-(2,4-dimethoxyphenyl)-2-oxo-3-pyrroline | Red-orange | 480(289) <br> 372(274) |
| XXVI | Hydrazobenzene | | 4-cyano-5-dicyanomethylene-3-(1,2-diphenylhydrazino)-2-oxo-3-pyrroline | Brown | 415 |
| XXVII | 2-mercaptobenzothiazole | | 3-(2-benzothiazolylthio)-4-cyano-5-dicyanomethylene-2-oxo-3-pyrroline | Orange | 490(21.5) <br> 370(132) |
| XXVIII | 2,6-dimethylphenol | | 4-cyano-5-dicyanomethylene-3-(3,5-dimethyl-4-hydroxyphenyl)-2-oxo-3-pyrroline | Magenta | 480(19.7) <br> 372(120) |
| XXIX | Sodium salt of 1-naphthol-2-sulfonic acid | | 4-cyano-5-dicyanomethylene-3-(4-hydroxy-3-sodiosulfonyl-1-naphthyl)-2-oxo-3-pyrroline | Brownish magenta | 545(19.5) <br> 390(480) |
| XXX | m-(1-hydroxy-2-naphthamido)benzaldehyde ethylene glycol acetal | | 4-cyano-5-dicyanomethylene-3-[3-N-(m-2-dioxolanylphenyl)carbamyl-4-hydroxy-1-naphthyl]-2-oxo-3-pyrroline | Magenta | 540(99) <br> 350(545) |

TABLE I—Continued

| Example | Color former | Structure of 3-substituent in 4-cyano-5-dicyanomethylene-2-oxo-3-pyrroline | Name of dye | Acetone/acetonitrile solution Color | Absorption maxima (millimicrons) |
|---|---|---|---|---|---|
| XXXI | p-methoxybenzaldehyde p-methoxyanil. | | 4-cyano-5-dicyanomethylene-3-(p-methoxyphenyl-p-methoxyphenyliminomethyl)-2-oxo-3-pyrroline. | Yellow-green | 418(217) 330(386) |
| XXXII | 1-hydroxy-7-oxo-1,3,5-cycloheptatriene. | | 4-cyano-5-dicyanomethylene-3-(1-hydroxy-7-oxo-1,3,5-cycloheptatrien-4-yl)-2-oxo-3-pyrroline. | Grey-purple | 565(31.5) 370(303) 352(353) |
| XXXIII | 2,6-dimethylaniline | | 3-(4-amino-3,5-dimethylphenyl)-4-cyano-5-dicyanomethylene-2-oxo-3-pyrroline. | Blue | 580(15.2) 397(240) |
| XXXIV | 3,5-diamino-1,2,4H-triazole. | | 4-cyano-3-(5-amino-1,2,4H-triazol-3-ylamino-5-dicyanomethylene-2-oxo-3-pyrroline. | Magenta | 540(32) 370(101.4) |
| XXXV | N-n-butylcarbazole | | 3-(9-n-butyl-3-carbazolyl)-4-cyano-5-dicyanomethylene-2-oxo-3-pyrroline. | Purple | 550(13.4) 370(105) 347(139) 330(147) |
| XXXVI | 1-(p-tolylamino)-7-(p-tolylimino)-1,3,5-cycloheptatriene. | | 4-cyano-5-dicyanomethylene-2-oxo-3-(1-[p-tolylamino]-7-[p-tolylimino]-1,3,5-cycloheptatrien-4-yl)-3-pyrroline. | Green | 675(150) 410(130) |
| XXXVII | 4-bromo-1-methylamino-7-methylimino-1,3,5-cycloheptatriene. | | 3-(N-[4-bromo-7-methylimino-1,3,5-cycloheptatrien-1-yl]-N-methylamino)-4-cyano-5-dicyanomethylene-2-oxo-3-pyrroline. | Orange-yellow | 670(6.4) 540(*)(13.3) 510(*)(14.3) 420(1805) 363(320) |
| XXXVIII | 1-methylamino-7-methylimino-1,3,5-cycloheptatriene. | | 4-cyano-5-dicyanomethylene-3-(1-methylamino-7-methylimino-1,3,5-cycloheptatrien-4-yl)-2-oxo-3-pyrroline. | Green | 673(60.4) 420(685) 353(91) |
| XXXIX | 1-methoxy-7-oxo-1,3,5-cycloheptatriene. | | 4-cyano-5-dicyanomethylene-3-(1-methoxy-7-oxo-1,3,5-cycloheptatrien-4-yl)-2-oxo-3-pyrroline. | Magenta | 565(21.3) 400(*)(168) 365(*)(940) 350(*)(1705) |
| XL | Anisole | | 4-cyano-5-dicyanomethylene-3-(p-methoxyphenyl)-2-oxo-3-pyrroline. | do | 535(10) 367(290) |
| XLI | 2-aminobenzothiazole | | 3-(2-benzothiazolylamino)-4-cyano-5-dicyanomethylene-2-oxo-3-pyrroline. | Red | 475(*)(1265) 450(*)(132) 390(152) |
| XLII | 1-benzylthio-7-(p-tolylimino)-1,3,5-cycloheptatriene. | | 3-(1-benzylthio-7-[p-tolylimino]-1,3,5-cycloheptatrien-4-yl)-4-cyano-5-dicyanomethylene-2-oxo-3-pyrroline. | Red-brown | 550(16) 380(265) |
| XLIII | N-p-methoxyphenyl-pyrrole. | | 4-cyano-5-dicyanomethylene-3-(N-p-methoxyphenyl-2-pyrrolyl)-2-oxo-3-pyrroline. | Red | 493(128) 380(65) |

TABLE I—Continued

| Example | Color former | Structure of 3-substituent in 4-cyano-5-dicyanomethylene-2-oxo-3-pyrroline | Name of dye | Acetone/acetonitrile solution Color | Absorption maxima (millimicrons) |
|---|---|---|---|---|---|
| XLIV | Aniline | | 3-anilino-4-cyano-5-dicyanomethylene-2-oxo-3-pyrroline. | Yellow | 415 |
| XLV | N-methylaniline | | 4-cyano-5-dicyanomethylene-3-(N-methylanilino)-2-oxo-3-pyrroline. | do | 425 |
| XLVI | m-Diethylaminophenol | | 4-cyano-5-dicyanomethylene-3-(4-diethylamino-2-hydroxyphenyl)-2-oxo-3-pyrroline. | Blue | 600(2.46) 508(2.32) 370(3.12) |
| XLVII | Phenol | | 4-cyano-5-dicyanomethylene-3-(p-hydroxyphenyl)-2-oxo-3-pyrroline. | Magenta | 700(2.7) 550(1.78) 372(20.6) |
| XLVIII | Furan | | 4-cyano-5-dicyanomethylene-3-(2-furyl)-2-oxo-3-pyrroline. | Yellow | 435 |
| XLIX | Thiophene | | 4-cyano-5-dicyanomethylene-2-oxo-3-(2-thienyl)-3-pyrroline. | grey-magenta | 540 |
| L | Toluene | | 4-cyano-5-dicyanomethylene-2-oxo-3-(p-tolyl)-3-pyrroline. | do | 702(1.24) 504(0.89) |

EXAMPLE LI

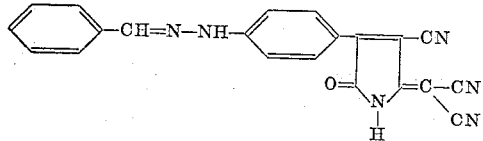

3 - chloro - 4 - cyano - 5 - dicyanomethylene - 2 - oxo-3-pyrroline (408 parts) and benzaldehyde phenylhydrazone (392 parts) are dissolved together in 10,000 parts of acetonitrile. Reaction takes place rapidly at room temperature and is substantially complete within a few minutes. About 325 parts of crude 3-p-(benzylidinehydrazino)phenyl - 4 - cyano - 5 - dicyanomethylene - 2 - oxo-3-pyrroline is collected by filtration as a crystalline precipitate. A portion of this product is dissolved in boiling acetic acid to give a green solution showing absorption maxima at 605, 580, 455 and 346 millimicrons with molecular extinction coefficients of 10,900, 10,200, 14,600 and 14,600 respectively.

EXAMPLE LII

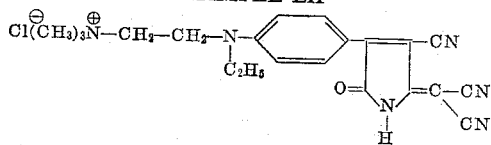

β - (N - ethylanilino)ethyltrimethylammonium chloride (480 parts) and 3-chloro-4-cyano-5-dicyanomethylene-2-oxo-3-pyrroline (408 parts) are dissolved together in 10,000 parts of acetonitrile. Reaction takes place rapidly at room temperature with the formation of a crystalline precipitate of β-[N-ethyl-N-(p-[4-cyano-5-dicyanomethylene-2-oxo - 3 - pyrrolin - 3 - yl]phenyl)amino]ethyltrimethylammonium chloride. This dye shows absorption maxima at 586 and 395 millimicrons with molecular extinction coefficients of 11,100 and 10,700 respectively. This product dyes polyethylene terephthalate fibers a lavender-blue in color.

When N-(β-acetylethyl)-N-ethylaniline or N-(β-ethoxyethyl)-N-ethylaniline is substituted for β-(N-ethylanilino)-ethyltrimethylammonium chloride in Example LII, there is obtained 3-(p-[N-(β-acetylethyl)-N-ethylamino]phenyl)-4-cyano-5-dicyanomethylene-2-oxo-3-pyrroline or 4-cyano - 5 - dicyanomethylene - 3 - (p - [N - (β - ethoxyethyl)-N-ethylanilino]-phenyl)-2-oxo-3-pyrroline respectively.

EXAMPLE LIII

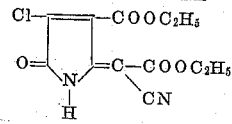

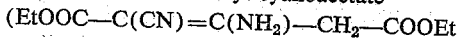

A solution of 52 parts of sodium in 553 parts of absolute ethanol is cooled to 0° C. To this solution is added 184 parts of the dimer of ethyl cyanoacetate (EtOOC—C(CN)=C(NH$_2$)—CH$_2$—COOEt Baron et al., J. Chem. Soc. 85, 1736 (1904)) and 166 parts of diethyl oxalate. After standing three hours at room temperature the mixture is poured into 2640 parts of benzene and filtered. Evaporation of the solvent yields 340 parts of the disodium salt of 5-(α-cyano-α-ethoxycarbonyl)methylene - 4 - ethoxycarbonyl - 3 - hydroxy-2-oxo-3-pyrroline.

The disodium salt (170 parts) is treated with 200 parts of phosphorus oxychloride in 391 parts of acetonitrile. The mixture is cooled at 0° C. during the spontaneous reaction and then let stand overnight at room temperature. Crystalline 3-chloro-5-(α-cyano-α-ethoxycarbonyl)-methylene-4-ethoxycarbonyl-2-oxo-3-pyrroline is obtained by filtration and drying.

EXAMPLE LIV

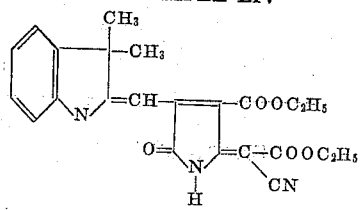

To a solution of 5 parts of 3-chloro-5-(α-cyano-α-ethoxycarbonyl)methylene - 4 - ethoxycarbonyl - 2 - oxo-3-pyrroline in 780 parts of acetonitrile is added 5 parts of 2-methylene-1,3,3-trimethylindoline (Fischer's base).

5 - (α - cyano - α - ethoxycarbonyl)methylene - 4-ethoxycarbonyl - 2 - oxo - 3 - (1,3,3 - trimethyl-2-indolinylidene)methyl-3-pyrroline forms as a reddish blue dye. The solution shows absorption maxima at 582, 550 and 360 millimicrons.

The process of Example LIV is repeated using other color formers in place of Fischer's base. The formulas and colors of the resulting dyes are shown in Table II.

To a solution of 46 parts of sodium in 3947 parts of ethanol is added 132 parts of malononitrile dimer and 178 parts of ethyl phenylglyoxylate (ethyl ester of benzoylformic acid). The solution warms spontaneously and turns yellow. After one hour the solution is poured into 20,000 parts of water and acidified with aqueous hydrochloric acid. 4-cyano-5-dicyanomethylene-2-oxo-3-

TABLE II

| Example | Color former | Structure of 3-substituent in 5-(α-cyano-α-ethoxycarbonyl)methylene-4-ethoxycarbonyl-2-oxo-3-pyrroline | Name of dye | Solution Color | Absorption maxima (millimicrons) |
|---|---|---|---|---|---|
| LV | Pyrrole | (2-pyrrolyl) | 5-(α-cyano-α-ethoxycarbonyl)-methylene-4-ethoxycarbonyl-2-oxo-3-(2-pyrrolyl)-3-pyrroline. | Red orange | 482(108) 340(84) |
| LVI | Pyrrole-2-aldehyde dimethylhydrazone | (CH₃)₂NN=CH-(pyrrolyl) | 5-(α-cyano-α-ethoxycarbonyl)-methylene-3-[5-(dimethylhydrazonomethyl]-2-pyrrolyl)-4-ethoxycarbonyl-2-oxo-3-pyrroline. | Blue | 640 |
| LVII | Ethyl ester of benzoyl acetic acid | C₆H₅-CO-CH-COOC₂H₅ | 3-(1-benzoyl-1-ethoxycarbonyl)-methyl-5-(α-cyano-α-ethoxycarbonyl)methylene-4-ethoxycarbonyl-2-oxo-3-pyrroline. | Yellow | |
| LVIII | Furylacrolein phenylhydrazone | C₆H₅NHN=CH—CH=CH-(furyl) | 5-(α-cyano-α-ethoxycarbonyl)-methylene-4-ethoxycarbonyl-2-oxo-3-(5-[3-phenylhydrazonopropenyl]-2-furyl)-3-pyrroline. | Blue | 590(97) 367(420) |
| LIX | N,N-diethyl-α-naphthylamine | (C₂H₅)₂N-naphthyl | 5-(α-cyano-α-ethoxycarbonyl)-methylene-3-(4-N,N-diethylamino-1-naphthyl)-4-ethoxycarbonyl-2-oxo-3-pyrroline. | Purple | 570(21) 317(875) |
| LX | 1,1-bis(p-N,N-dimethylaminophenyl)ethylene | [(CH₃)₂N-C₆H₄]₂C=CH— | 5-(α-cyano-α-ethoxycarbonyl)-methylene-3-(2,2-bis[N,N-dimethylaminophenyl]vinyl)-4-ethoxycarbonyl-2-oxo-3-pyrroline. | Green | 605 340 |
| LXI | N-n-butylcarbazole | (9-N-butyl-3-carbazolyl) | 3-(9-N-butyl-3-carbazolyl)-5-(α-cyano-α-ethoxycarbonyl)-methylene-4-ethoxycarbonyl-2-oxo-3-pyrroline. | Yellow | |
| LXII | 1-(p-tolylamino)-7-(p-tolylimino)-1,3,5-cycloheptatriene | (tolyl)HN-(cycloheptatriene)=N-(tolyl) | 5-(α-cyano-α-ethoxycarbonyl)-methylene-4-ethoxycarbonyl-2-oxo-3-(1-[p-tolylamino]-7-[p-tolylimino]-1,3,5-cyclohepta-trien-4-yl)-3-pyrroline. | Orange | |
| LXIII | N-(β-benzoyloxyethyl)-N-ethylaniline | C₆H₅—COOCH₂CH₂—N(C₂H₅)-C₆H₄— | 3-(p-[N-β-benzoyloxyethyl-N-ethyl]aminophenyl)-5-(α-cyano-α-ethoxycarbonyl)methylene-4-ethoxycarbonyl-2-oxo-3-pyrroline. | Red | 550(45) 350(70) |

EXAMPLE LXIV

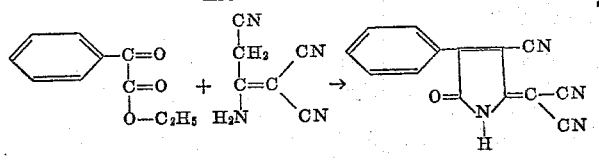

phenyl-3-pyrroline forms as a bright yellow precipitate which is collected by filtrate and dried. Yield 90 parts. After recrystallization from acetic acid, the product melts at 296–298° C. with decomposition.

*Analysis.*—Calc'd. for $C_{14}H_6N_4O$: C, 68.3; H, 2.4; N, 22.8. Found: C, 68.0; H, 2.7; N, 22.5.

EXAMPLE LXV

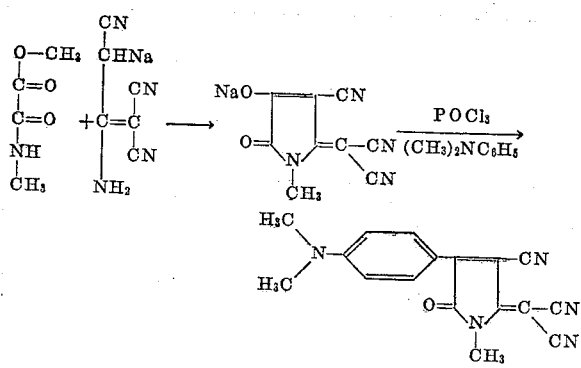

A mixture of 155 parts of the sodium salt of malononitrile dimer and 117 parts of the methyl ester of N-methyl-oxamate in 1957 parts of acetonitrile is stirred and heated at reflux for 16 hours. The mixture is filtered and the filtrate evaporated to dryness. The remaining solid is treated with a mixture of phosphorus oxychloride and N,N-dimethylaniline to obtain 4-cyano-5-dicyanomethylene - 3-(p-N,N-dimethylaminophenyl)-1-methyl-2-oxo-3-pyrroline as a bright blue dye.

EXAMPLE LXVI

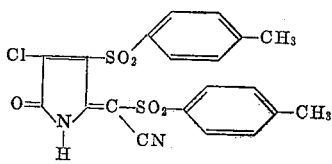

To a suspension of 410 parts of the monosodium salt of 5-(α-cyano-α-p-toluenesulfonyl)methylene-3-hydroxy-2-oxo-4-p-toluenesulfonyl-3-pyrroline (Example II, Part B) in 1957 parts of acetonitrile, 298 parts of oxalyl chloride is added slowly with stirring. The mixture is allowed to stand at room temperature for one hour and then filtered. The filtrate is evaporated to dryness to yield 161 parts of crystalline 3-chloro-5-(α-cyano-α-p-toluenesulfonyl)methylene-2-oxo-4-p-toluenesulfonyl-3-pyrroline.

EXAMPLE LXVII

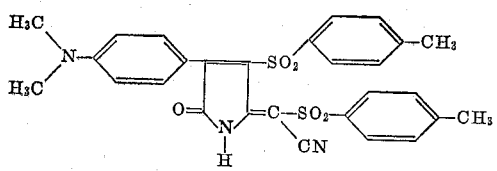

To a solution of 50 parts of 3-chloro-5-(α-cyano-α-p-toluenesulfonyl)methylene - 2 - oxo-4-p-toluenesulfonyl-3-pyrroline in 900 parts of ethyl acetate is added about 50 parts of N,N-dimethylaniline. The mixture is allowed to stand for four hours at room temperature. The resulting precipitate is collected by filtration, washed with ethyl acetate and dried to obtain 15 parts of 5-(α-cyano-α-p-toluenesulfonyl)methylene - 3 - (p-N,N-dimethylaminophenyl)-2-oxo-4-p-toluenesulfonyl-3-pyrroline in the form of iridescent green-gold needles.

Analysis.—Calc'd for $C_{28}H_{25}N_3O_5S_2$: C, 61.43; H, 4.57; N, 7.67. Found: C, 61.32; H, 4.59; N, 8.06.

EXAMPLE LXVIII

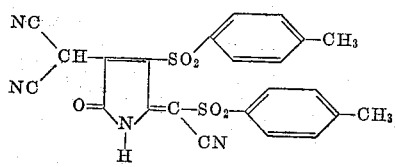

To a solution of about 5 parts of 3-chloro-5-(α-cyano-α - p-toluenesulfonyl)methylene-2-oxo-4-p-toluenesulfonyl-3-pyrroline in about 50 parts of acetonitrile (containing a trace of pyridine) is added about 5 parts of malononitrile. The solution rapidly turns orange with the formation of 5-(α-cyano-α-p-toluenesulfonyl)methylene-3-dicyanomethyl-2-oxo-4-p-toluenesulfonyl-3-pyrroline. The solution shows absorption maxima at 505 millimicrons and 480 millimicrons.

The following Table III shows additional dyes prepared by the process of Example LXVIII. In each preparation 5-parts of the indicated color former is substituted for malononitrile in Example LXVIII. The products formed, their color and absorption characteristics in acetonitrile solution are indicated in tabular form. In Examples LXXI–LXXX the pyridine is omitted.

TABLE III

| Example | Color former | Structure of 3-substituent in 5-(α-cyano-α-p-toluene-sulfonyl)methylene-2-oxo-4-p-toluenesulfonyl-3-pyrroline | Name of dye | Solution | |
|---|---|---|---|---|---|
| | | | | Color | Absorption maxima (millimicrons) |
| LXIX | Benzoylacetanilide | | 3-[(benzoyl)(N-phenylcarbamoyl)-methyl]-5-(α-cyano-α-p-toluenesulfonyl)methylene-2-oxo-4-p-toluenesulfonyl-3-pyrroline | Red-orange | 520 380 |
| LXX | α-Methylfuran | | 5-(α-cyano-α-p-toluenesulfonyl)-methylene-3-(5-methyl-2-furyl)-2-oxo-4-p-toluenesulfonyl-3-pyrroline | Orange | 520 370 |
| LXXI | N-methylaniline | | 5-(α-cyano-α-p-toluenesulfonyl)-methylene-3-(p-N-methylaminophenyl)-2-oxo-4-p-toluenesulfonyl-3-pyrroline | Yellow | 420 |
| LXXII | 2,6-dimethylaniline | | 3-(4-amino-3,5-dimethylphenyl)-5-(α-cyano-α-p-toluenesulfonyl)-methylene-2-oxo-4-p-toluenesulfonyl-3-pyrroline | do | 396 |

TABLE III—Continued

| Example | Color former | Structure of 3-substituent in 5-(α-cyano-α-p-toluene-sulfonyl)methylene-2-oxo-4-p-toluenesulfonyl-3-pyrroline | Name of dye | Solution Color | Absorption maxima (millimicrons) |
|---|---|---|---|---|---|
| LXXIII | Benzaldehyde phenylhydrazone | ⟨⟩-NH-N=CH-⟨⟩ | 5-(α-cyano-α-p-toluenesulfonyl)-methylene-2-oxo-3-(p-phenylhydrazonomethyl)phenyl-4-p-toluenesulfonyl-3-pyrroline | Yellow-orange | 450 / 340 |
| LXXIV | m-Dimethoxybenzene | $H_3C-O$-⟨⟩-$O-CH_3$ | 5-(α-cyano-α-p-toluenesulfonyl)-methylene-3-(2,4-dimethoxyphenyl)-2-oxo-4-p-toluenesulfonyl-3-pyrroline | Red-orange | 475 / 355 |
| LXXV | 1-methylamino-7-methylimino-1,3,5-cycloheptatriene | $H_3C-N=$⟨⟩$-N-CH_3$ $H$ | 5-(α-cyano-α-p-toluenesulfonyl)-methylene-3-(1-methylamino-7-methylimino-1,3,5-cycloheptatrien-4-yl)-2-oxo-4-p-toluenesulfonyl-3-pyrroline | Yellow | 415 / 347 |
| LXXVI | 1-benzylthio-7-(p-tolylimino)-1,3,5-cycloheptatriene | $H_3C$-⟨⟩-N=⟨⟩-$CH_2$-S-⟨⟩ | 3-(1-benzylthio-7-[p-tolylimino]-1,3,5-cycloheptatrien-4-yl)-5-(α-cyano-α-p-toluenesulfonyl)-methylene-2-oxo-4-p-toluenesulfonyl-3-pyrroline | ....do.... | 375 |
| LXXVII | Pyrrole-2-aldehyde dimethylhydrazone | $(CH_3)_2NN=CH$-⟨N-H⟩ | 5-(α-cyano-α-p-toluenesulfonyl)-methylene-3-(5-dimethylhydrazonomethyl]-2-pyrryl)-2-oxo-4-p-toluenesulfonyl-3-pyrroline | Blue | 610 / 540 |
| LXXVIII | Indole | ⟨indole-NH⟩ | 5-(α-cyano-α-p-toluenesulfonyl)-methylene-3-(3-indolyl)-2-oxo-4-p-toluenesulfonyl-3-pyrroline | Red | 530 |
| LXXIX | 2-methylene-1,3,3-trimethylindoline | ⟨indoline with $CH_3$, $CH_3$, =CH-, $N-CH_3$⟩ | 5-(α-cyano-α-p-toluenesulfonyl)-methylene-2-oxo-4-p-toluenesulfonyl-3-(1,3,3-trimethyl-2-indolylidene)-methyl-3-pyrroline | Purple | 543 / 515 |
| LXXX | Malononitrile dimer | $NC$\\$C=C$/$NH_2$ $NC$/  \\$CH-$ $NC$ | 3-(1-amino-2,2-dicyanovinyl)-cyanomethyl-5-(α-cyano-α-p-toluenesulfonyl)methylene-2-oxo-4-p-toluenesulfonyl-3-pyrroline | Red | 490 / 350 |

The colors indicated for the solutions of the above dyes are obtained on cellulose acetate and nylon fabrics when these dyes are applied according to the procedure of Dyeing A, above.

As shown in the examples above, 3-chloro-4-cyano-5-dicyanomethylene-2-oxo-3-pyrroline is an unusually active coupling agent. The similarly active 3-bromo-4-cyano-5-dicyanomethylene-2-oxo-3-pyrroline is obtained by employing a brominating agent such as phosphorus tribromide, phosphorus oxybromide, thionyl bromide or the like in place of oxalyl chloride in Example IV.

In a similar manner when phosphorus oxybromide is used in place of phosphorus oxychloride in Example LIII, 3-bromo-5-(α-cyano-α-ethoxycarbonyl)methylene-4-ethoxycarbonyl-2-oxo-3-pyrroline is obtained. Also, when thionyl bromide is used in place of oxalyl chloride in Example LXVI, 3-bromo-5-(α-cyano-α-p-toluenesulfonyl)methylene-2-oxo-4-p-toluenesulfonyl-3-pyrroline is obtained.

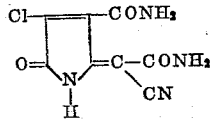

The dimer of ethyl cyanoacetate is treated with concentrated ammonium hydroxide (Wagner and Zook, "Synthetic Organic Chemistry," John Wiley and Sons, 1953, Method 352, page 568) to obtain 3-amino-2-cyano-2-pentene-1,5-dioic acid diamide (i.e., the dimer of cyanoacetamide). This is substituted for the dimer of ethyl cyanoacetate in the process of Example LIII to obtain 4-carbamoyl-5-(α-carbamoyl-α-cyano)methylene-3-chloro-2-oxo-3-pyrroline. When phosphorus oxybromide is used in place of phosphorus oxychloride, 3-bromo-4-carbamoyl-5-(α-carbamoyl-α-cyano)methylene-2-oxo-3-pyrroline is obtained.

3-amino-2-cyano-2-pentene-1,5-dioic acid diamide is heated with methylamine hydrochloride or dimethylamine hydrochloride (Wagner and Zook, op., cit., Method 351, page 568) to obtain the corresponding bis(monomethylamides) or bis-(dimethylamide). Other substituted diamides are obtained by using the corresponding amines. In the process of Example LIII these diamides give 3-chloro-5-(α-cyano-α-methylcarbamoyl)-methylene-4-methylcarbamoyl-2-oxo-3-pyrroline and 3-chloro-5-(α-cyano-α-dimethylcarbamoyl)methylene-4-dimethylcarbamoyl-2-oxo-3-pyrroline respectively as well as the other mono- and dihydrocarbylcarbamoyl compounds. Corresponding 3-bromo compounds are obtained as above.

The sodium salt of 4-cyano-5-dicyanomethylene-3-hydroxyl-1-methyl-3pyrroline is prepared by substituting the monomethylamide of methyl oxalate (MeOCOCONHCH₃)

for ethyl oxalate in Part A of Example I. This salt is treated with oxalyl chloride as in Example IV to obtain 3 - chloro-4-cyano-5-dicyanomethylene-1-methyl-2-oxo-3-pyrroline. When thionyl bromide is used in place of oxalyl chloride, 3-bromo-4-cyano-5-dicyanomethylene-1-methyl-2-oxo-3-pyrroline is obtained.

When the mono-n-butylamide of ethyl oxalate is employed in the procedures above, 1-(n-butyl)-3-chloro-4-cyano-5-dicyanomethylene-2-oxo-3-pyrroline and 1-(n-butyl) - 3 - bromo - 4 - cyano-5-dicyanomethylene-2-oxo-3-pyrroline are obtained respectively. In a similar manner the monophenylamide yields 3-chloro-4-cyano-5-dicyanomethylene-2-oxo-1-phenyl-3-pyrroline and 3-bromo-4 - cyano - 5-dicyanomethylene-2-oxo-1-phenyl-3-pyrroline respectively.

Corresponding substitution of monohydrocarbylamides of alkyl oxalates for ethyl oxalate in Part B of Example II and in Example LIII yields to the corresponding 5-cyanomethylene - 3 - halogen - 1 - hydrocarbyl - 2-oxo-3-pyrrolines.

Dyes are obtained by reacting the chloro and bromo compounds noted above with any of the color formers shown in the previous examples. For example, when N,N-dimethylaniline is employed, 5-(α-cyano-α-ethoxycarbonyl)methylene-3-(p-N,N - dimethylaminophenyl)-4-ethoxycarbonyl-2-oxo-3-pyrroline, 5-(α-cyano-α - p - toluenesulfonyl)methylene-3-(p-N,N - dimethylaminophenyl)-2-oxo-4-)p-toluenesulfonyl-3-pyrroline, 4-carbamoyl - 5 - (α-carbamoyl-α-cyano)methylene-3 - (p - N,N - dimethylaminophenyl)-2-oxo-3-pyrroline, 5-(α-cyano - α - methylcarbamoyl)methylene - 3 - ( p- N,N-dimethylaminophenyl)-4-methylcarbamoyl-2-oxo-3-pyrroline, 5-(α-cyano - α - dimethylcarbamoyl)methylene-3-(p - N,N - dimethylaminophenyl)-4-dimethylcarbamoyl-2-oxo-3-pyrroline, 4-cyano-5-dicyanomethylene-3-(p - N,N-dimethylaminophenyl)-1-methyl-2-oxo-3-pyrroline, 1-(n-butyl)-4-cyano-5-dicyanomethylene - 3 - (p - N,N-dimethylaminophenyl)-2-oxo-3-pyrroline and 4-cyano-5-dicyanomethylene-3-(p-N,N-dimethylaminophenyl)-2-oxo-1-phenyl-3-pyrroline are obtained respectively. In like manner when 1,1-bis(p-N,N-dimethylaminophenyl)ethylene is the color former, 5-(α-cyano-α-ethoxycarbonyl)methylene-3-[2,2 - bis(p-N,N-dimethylaminophenyl)vinyl] - 4 - ethoxycarbonyl-2-oxo-3-pyrroline, 5-(α-cyano-α-p - toluenesulfonyl)methylene-3-[2,2-bis(p - N,N-dimethylaminophenyl)vinyl]-2-oxo-4-p-toluenesulfonyl-3-pyrroline, 4-carbamoyl-5-(α-carbamoyl-α-cyano)methylene-3-[2,2 - bis(p - N,N - dimethylaminophenyl)vinyl]-2-oxo-3-pyrroline, 5-(α-cyano-α-methylcarbamoyl)methylene-3-[2,2 - bis(p - N,N - dimethylaminophenyl)vinyl]-4-methylcarbamoyl-2-oxo-3-pyrroline, 5-(α-cyano-α-dimethylcarbamoyl)methylene-3-[2,2-bis(p-N,N-dimethylaminophenyl)vinyl]-4-dimethylcarbamoyl-2 - oxo-3-pyrroline, 4-cyano-5-dicyanomethylene-3-[2,2 - bis(p-N,N - dimethylaminophenyl)vinyl]-1-methyl-2-oxo-3-pyrroline, 1 - (n - butyl)-4-cyano-5-dicyanomethylene-3-[2,2-bis(p-N,N-dimethylaminophenyl)vinyl]-2-oxo-3-pyrroline and 4-cyano-5-dicyanomethylene-3-[2,2-bis(p - N,N - dimethylaminophenyl)vinyl]-2-oxo-1-phenyl-3-pyrroline are obtained respectively, the similar chloro and bromo starting materials yielding identical products from a given color former.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Dyes represented by the formula

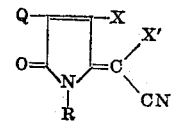

wherein R is a member of the class consisting of hydrogen and hydrocarbon radicals X and X' are members of the class consisting of —CN, —SO₂R, —COOR and —CONR₂ groups, and Q is a monovalent organic radical such that the corresponding compound QH will condense with benzene diazonium chloride to yield an azo dye.

2. Dihydrate of the monosodium derivative of 4-cyano-5-dicyanomethylene-3-hydroxy-2-oxo-3-pyrroline.

3. 4-cyano-5-dicyanomethylene-3-(p - N,N - dimethylaminophenyl)-2-oxo-3-pyrroline.

4. 3 - chloro-4-cyano-5-dicyanomethylene-2-oxo-3-pyrroline.

5. 4-cyano-5-dicyanomethylene-3-[2,2-bis(p - N,N - dimethylaminophenyl)vinyl]-2-oxo-3-pyrroline.

6. β-[N-ethyl-N-(p-[4 - cyano-5-dicyanomethylene - 2-oxo-3-pyrrolin-3-yl]phenyl)amino]ethyltrimethylammonium chloride.

7. Process which comprises reacting a compound of the formula

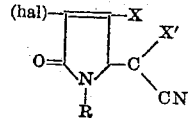

wherein (hal) represents halogen, R represents a member of the class consisting of hydrogen and hydrocarbon radicals and X and X' represent members of the class consisting of —CN, —SO₂R, —COOR and —CONR₂ groups, with a compound of the formula

QH, wherein Q is a monovalent organic radical, the compound QH being capable of condensing with benzene diazonium chloride to yield an azo dye, whereupon a compound of the formula

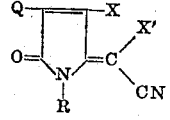

wherein Q, R, X and X' have the same significance as above, is obtained.

8. Compounds of the formula

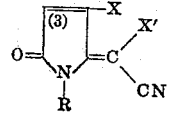

wherein the 3-position is substituted by members of the group consisting of hydrogen, halogen and hydrocarbon radicals, R is a member of the class consisting of hydrogen and hydrocarbon radicals, and X and X' are members of the class consisting of —CN, SO₂R, —COOR and —CON(R)₂ groups.

No references cited.

UNITED STATES PATENT OFFICE
CERTIFICATE OF CORRECTION

Patent No. 3,013,013 December 12, 1961

Rudolph A. Carboni

It is hereby certified that error appears in the above numbered patent requiring correction and that the said Letters Patent should read as corrected below.

Column 22, lines 33 to 37, for that portion of the formula reading

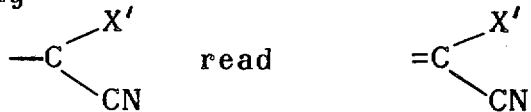

same column 22, line 66, for "SO$_2$R" read -- -SO$_2$R --.

Signed and sealed this 3rd day of July 1962.

(SEAL)
Attest:

ERNEST W. SWIDER
Attesting Officer

DAVID L. LADD
Commissioner of Patents